US009335011B2

(12) United States Patent
Srivastava et al.

(10) Patent No.: US 9,335,011 B2
(45) Date of Patent: May 10, 2016

(54) OXYFLUORIDE PHOSPHOR COMPOSITIONS AND LIGHTING APPARATUS THEREOF

(71) Applicant: General Electric Company, Schenectady, NY (US)

(72) Inventors: Alok Mani Srivastava, Niskayuna, NY (US); William Winder Beers, Chesterland, OH (US); William Erwin Cohen, Cleveland, OH (US); Holly Ann Comanzo, Niskayuna, NY (US)

(73) Assignee: General Electric Company, Niskayuna, NY (US)

(*) Notice: Subject to any disclaimer, the term of this patent is extended or adjusted under 35 U.S.C. 154(b) by 141 days.

(21) Appl. No.: 14/322,047

(22) Filed: Jul. 2, 2014

(65) Prior Publication Data

US 2016/0003422 A1    Jan. 7, 2016

(51) Int. Cl.
*C09K 11/86* (2006.01)
*F21K 99/00* (2016.01)
*C09K 11/77* (2006.01)
*C09K 11/61* (2006.01)

(52) U.S. Cl.
CPC .............. *F21K 9/56* (2013.01); *C09K 11/617* (2013.01); *C09K 11/777* (2013.01); *C09K 11/7774* (2013.01)

(58) Field of Classification Search
CPC ............................ C09K 11/7704; C09K 11/777
USPC .................................................. 252/301.4 H
See application file for complete search history.

(56) References Cited

U.S. PATENT DOCUMENTS

| | | | |
|---|---|---|---|
| 8,344,611 B2 | 1/2013 | Im et al. | |
| 8,535,565 B2 | 9/2013 | Im et al. | |
| 2009/0174310 A1* | 7/2009 | Vogt et al. | 313/503 |
| 2010/0033075 A1 | 2/2010 | Naum et al. | |
| 2010/0096974 A1* | 4/2010 | Setlur et al. | 313/487 |
| 2013/0020930 A1 | 1/2013 | Li et al. | |

FOREIGN PATENT DOCUMENTS

| | | |
|---|---|---|
| CN | 101325238 A | 12/2008 |
| CN | 101323785 B | 9/2012 |
| CN | 103059865 A | 4/2013 |

(Continued)

OTHER PUBLICATIONS

Setlur et al., "Energy-Efficient, High-Color-Rendering LED Lamps Using Oxyfluoride and Fluoride Phosphors", Chemistry of Materials, ACS Publications, Jun. 4, 2010, pp. 4076-4082.

(Continued)

*Primary Examiner* — Nimeshkumar Patel
*Assistant Examiner* — Christopher Raabe
(74) *Attorney, Agent, or Firm* — Mary Louise Stanford

(57) ABSTRACT

A lighting apparatus having a phosphor material radiationally coupled to a light source is presented. The phosphor material includes a green emitting phosphor composition of general formula I: $R_{3-x-z}M_xCe_zT_{5-y}N_yO_{12-x-y}F_{x+y}$; where $0 \leq x < 3.0$; $0 \leq y < 5.0$, $0 < z \leq 0.30$; and if $x=0$, then $y>0$ or if $y=0$, then $x>0$; R is Y, Tb, Gd, La, Lu or a combination thereof; T is Al, Sc, Ga, In or combinations thereof; M is Ca, Sr, Ba or a combination thereof; N is Mg, Zn or a combination thereof. The phosphor composition of formula I may be combined with an additional phosphor to generate white light.

18 Claims, 2 Drawing Sheets

(56) References Cited

FOREIGN PATENT DOCUMENTS

| | | |
|---|---|---|
| DE | 202004020550 U1 | 8/2005 |
| EP | 2607448 A1 | 6/2013 |
| KR | 20130074649 A | 7/2013 |
| WO | 2008058462 A1 | 5/2008 |
| WO | 2012122401 A2 | 9/2012 |
| WO | 2013158929 A1 | 10/2013 |

OTHER PUBLICATIONS

Denault et al., "A green-yellow emitting oxyfluoride solid solution phosphor $Sr_2Ba(AlO_4F)_{1-x}(SiO_5)_x:Ce^{3+}$ for thermally stable, high color rendition solid state white lighting", Journal of Materials Chemistry, 2012, vol. 22, pp. 18204-18213.

PCT Search Report and Written Opinion issued in connection with corresponding Application No. PCT/US2015/038779 on Sep. 28, 2015.

\* cited by examiner

US 9,335,011 B2

OXYFLUORIDE PHOSPHOR COMPOSITIONS AND LIGHTING APPARATUS THEREOF

BACKGROUND

The invention relates generally to green emitting phosphors applicable to lighting systems. More particularly, the invention relates to green-emitting phosphors for solid state lighting systems, and a lighting apparatus employing these phosphors and blends thereof.

Generation of "white light" is currently achieved by so called "white LEDs" that are constituted by employing a blue LED in conjunction with a yellow-green emitting, cerium-doped yttrium aluminum garnet known as "YAG," having the formula $Y_3Al_5O_{12}:Ce^{3+}$. YAG has been historically used in these lighting systems because of the high quantum efficiency under blue light excitation and a broad emission spectrum that peaks in the yellow spectral region. The drawback of YAG based lighting systems is the relatively poor color rendering properties and high color temperature. For example, when an object is illuminated under such currently used white LEDs, they cannot imitate the colors illuminated by natural light.

Although numerous phosphors have been proposed in the past several years, the range of phosphors that are suitable for LEDs is limited. Therefore, there is a need for new green-emitting phosphors that produce improved color rendering in white light emitting solid state lighting systems.

BRIEF DESCRIPTION

Briefly, most of the embodiments of the present invention provide a lighting apparatus having a phosphor material radiationally coupled to a light source. The phosphor material includes a phosphor composition of general formula I: $R_{3-x-z}M_xCe_zT_{5-y}N_yO_{12-x-y}F_{x+y}$; where $0 \leq x < 3.0$; $0 \leq y < 5.0$, $0 < z \leq 0.30$; and if $x = 0$, then $y > 0$ or if $y = 0$, then $x > 0$; R is Y, Tb, Gd, La, Lu or a combination thereof; T is Al, Sc, Ga, In or combinations thereof; M is Ca, Sr, Ba or a combination thereof; N is Mg, Zn or a combination thereof.

In one embodiment, a lighting apparatus includes a light source; and a phosphor material radiationally coupled to the light source. The phosphor material includes a blend of a phosphor composition of general formula I: $R_{3-x-z}M_xCe_zT_{5-y}N_yO_{12-x-y}F_{x+y}$; where $0 \leq x < 3.0$; $0 \leq y < 5.0$, $0 < z \leq 0.30$; and if $x = 0$, then $y > 0$ or if $y = 0$, then $x > 0$; R is Y, Tb, Gd, La, Lu or a combination thereof; T is Al, Sc, Ga, In or combinations thereof; M is Ca, Sr, Ba or a combination thereof; N is Mg, Zn or a combination thereof, and a phosphor composition having an emission peak at a wavelength in a range from about 540 nanometers to about 650 nanometers.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
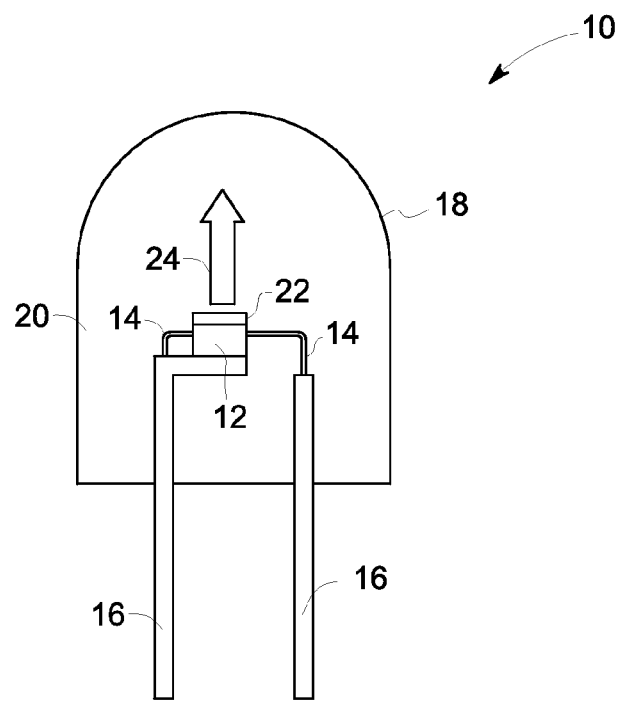
FIG. 1 is a schematic cross sectional view of a lighting apparatus, in accordance with one embodiment of the invention.
Figure 2:
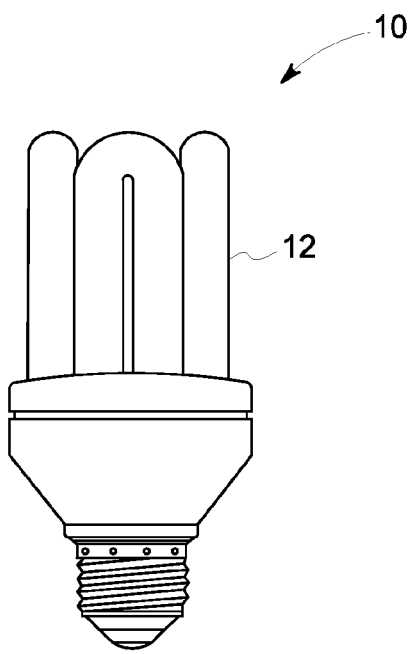
FIG. 2 is a schematic cross sectional view of a lighting apparatus, in accordance with another embodiment of the invention.

Approximating language, as used herein throughout the specification and claims, may be applied to modify any quantitative representation that could permissibly vary without resulting in a change in the basic function to which it is related. Accordingly, a value modified by a term or terms, such as "about," is not limited to the precise value specified. In some instances, the approximating language may correspond to the precision of an instrument for measuring the value.

In the following specification and the claims that follow, the singular forms "a", "an" and "the" include plural referents unless the context clearly dictates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances, an event or capacity can be expected, while in other circumstances the event or capacity cannot occur this distinction is captured by the terms "may" and "may be".

As used herein, the term "phosphor" or "phosphor material" or "phosphor composition" may be used to denote both a single phosphor composition as well as a blend of two or more phosphor compositions. As used herein, the term "lamp" or "lighting apparatus" or "lighting system" refers to any source of visible and/or ultraviolet light which can be generated by at least one light emitting element producing a light emission when energized, for example a phosphor material, a light emitting diode.

Particular application is described, herein, in conjunction with converting LED-generated ultraviolet (UV), violet, or blue radiation into a desired color light or white light for general illumination or other purposes. It should be appreciated, however, that the invention is also applicable to the conversion of radiation from UV, violet, and/or blue lasers, as well as other light sources, to white light.

Embodiments of the present invention are directed to a lighting apparatus that includes a phosphor material radiationally coupled to a light source. In one embodiment, the light source can be a semiconductor radiation source, for example a light emitting diode (LED) or an organic light emitting device (OLED). Radiationally coupled means that radiation from the light source is transmitted to the phosphor material, and the phosphor emits radiation of a different wavelength. A combination of the light from the light source and the light emitted from the phosphor material may be used to produce a desired color emission or white light. For example, a white light emitting LED device may be based on a blue emitting InGaN LED chip. The blue emitting LED chip may be coated with a phosphor blend to convert some of the blue radiation to a complementary color, e.g. a green emission or a white emission.

Non-limiting examples of lighting apparatus or devices include devices for excitation by light-emitting diodes (LEDs) such as fluorescent lamps, cathode ray tubes, plasma display devices, liquid crystal displays (LCD's), UV excitation devices, such as in chromatic lamps, lamps for backlighting, liquid crystal systems, plasma screens, xenon excitation lamps, and UV excitation marking systems. These uses are meant to be merely exemplary and not exhaustive.

FIG. 1 illustrates a lighting apparatus or lamp 10 according to some embodiments of the present invention. The lamp 10 includes a light emitting diode (LED) chip 12, and leads 14 electrically attached to the LED chip. The leads 14 provide current to LED chip 12 and thus cause it to emit radiation. The LED chip 12 may be any semiconductor blue or ultraviolet light source, for example based on a nitride compound semiconductor of formula $In_iGa_jAl_kN$ (where $0 \leq i$; $0 \leq j$; $0 \leq k$ and $i+j+k=1$) having an emission wavelength greater than about 250 nm and less than about 550 nm. More particularly, the chip 12 may be a near-UV or blue emitting LED having a peak emission wavelength from about 300 nm to about 500 nm. Such LEDs are known in the art. In lighting apparatus 10, a phosphor material (as described below) is disposed on a surface of the LED chip 12, and is radiationally coupled to the chip 12. The phosphor material can be deposited on the LED 12 by any appropriate method known in the art. The light emitted by the LED chip 12 mixes with the light emitted by the phosphor material to produce desired emission (indicated by arrow 24).

Although the general discussion of the exemplary structures of the invention discussed herein are directed toward inorganic LED based light sources, it should be understood that the LED chip may be replaced by an organic light emissive structure or other radiation source, unless otherwise noted, and that any reference to an LED chip or semiconductor is merely representative of any appropriate radiation source.

With reference to FIG. 1, the LED chip 12 may be encapsulated within an envelope 18, which encloses the LED chip and an encapsulant material 20. The envelope 18 may be, for example, glass or plastic. The LED chip 12 may be enclosed by the encapsulant material 20. The encapsulant material 20 may be a low temperature glass, or a thermoplastic or thermoset polymer, or resin as known in the art, for example, a silicone or epoxy resin. In an alternate embodiment, the lamp 10 may only comprise an encapsulant without an outer envelope 18.

Various structures of the lamp 10 are known in the art. For example, in some embodiments, the phosphor material may be interspersed within the encapsulant material, instead of being disposed directly on the LED chip 12. In some other embodiments, the phosphor material may be coated onto a surface of the envelope, instead of being formed over the LED chip. In some embodiments, the lamp may include a plurality of LED chips. These different structures discussed with respect to FIG. 1 may be combined, with the phosphor material located in any two or all three locations or in any other suitable location, such as separately from the shell or integrated into the LED. Further, different phosphor blends may be used in different parts of the structure.

In some embodiments, the lighting apparatus can be a fluorescent lamp or a compact fluorescent lamp (CFL), in combination with a LED. For instance, a combination of a LED-generated light and a phosphor-generated light may be used to produce visible light having enhanced color contrast. In this instance, a LED can be mounted in the base of the fluorescent lamp, for example CFL lamp to add to or supplement light in select wavelength regions of the visible spectrum, such as a portion of the blue region, to the light being generated by the phosphor composition coated on the glass envelope 11 of a lamp 10.

In any of the above structures, the LED based lighting apparatus 10 may also include a plurality of particles (not shown) to scatter or diffuse the emitted light. These scattering particles would generally be embedded in the encapsulant 20. The scattering particles may include, for example, particles made from $Al_2O_3$ (alumina) or $TiO_2$ (titania). The scattering particles may effectively scatter the light emitted from the LED chip 12, preferably with a negligible amount of absorption.

Some embodiments of the invention provide a phosphor composition that may be used in the phosphor material provided in the lighting apparatus described herein. The phosphor composition is an oxyfluoride garnet having a general formula I: $R_{3-x-z}M_xCe_zT_{5-y}N_yO_{12-x-y}F_{x+y}$; where $0 \leq x < 3.0$; $0 \leq y < 5.0$, $0 < z \leq 0.30$; and if $x=0$, then $y>0$ or if $y=0$, then $x>0$; R is Y, Tb, Gd, La, Lu or a combination thereof; T is Al, Sc, Ga, In or combinations thereof; M is Ca, Sr, Ba or a combination thereof; N is Mg, Zn or a combination thereof. In some embodiments, when $y=0$, the general formula is $R_{3-x-z}M_xCe_zT_5O_{12-x}F_x$; where $0<x \leq 3.0$; $0<z \leq 0.30$. In some embodiments, when $x=0$, the general formula is $R_{3-z}Ce_zT_{5-y}N_yO_{12-y}F_y$; where $0<y \leq 5.0$, $0<z \leq 0.30$.

In general formula I, shown above, the addition of divalent cations is charge balanced by adjusting the amount of oxide and fluoride ions in the formula. In some specific embodiments, x ranges from about 0.05 to about 3.0. In some specific embodiments, y ranges from about 0.05 to about 5.0. In some specific embodiments, z ranges from about 0.01 to about 0.05.

The oxyfluoride garnet compositions, according to above formulation, absorb blue LED radiation (wavelength range between about 350 nm and about 470 nm) and emit green light. Advantageously, these compositions produce an emission spectrum in relatively narrow wavelength range from about 480 nanometers to about 650 nanometers. The emission spectrum is depressed in the yellow region and shifted towards blue region as compared to conventional garnet phosphors (for example, yttrium aluminum garnet—$Y_3Al_5O_{12}$: $Ce^{3+}$). In one embodiment, the peak emission of the phosphor composition of formula I exists in a wavelength range from about 520 nanometers to about 620 nanometers. In one embodiment, the peak emission occurs in a wavelength range from about 530 nanometers to about 580 nanometers. For example, FIG. 4 shows emission spectra of an exemplary oxyfluoride composition $Lu_{2.91}Ce_{0.09}Al_{4.80}Mg_{0.20}O_{11.8}F_{0.20}$.

In any of the phosphor compositions of general formula I, a portion R may be substituted with other equivalently charged ions. For example, $R^{3+}$ may be partially substituted with $M^{3+}$, and $T^{3+}$ may be partially substituted with $N^{3+}$. This may allow for tuning the spectrum obtained from the phosphor compositions. In addition, F may be partially or fully substituted with Cl, Br, I, or a combination thereof.

In some embodiments, the phosphor composition may have general formula of $R_{3-x-z}M_xCe_zT_{5-y}N_yO_{12-x-y}F_{x+y}$; where $0 \leq x < 3.0$; $0 \leq y < 5.0$, $0 < z \leq 0.30$; and if $x=0$, then $y>0$ or if $y=0$, then $x>0$; R is Y, Tb, Gd, La, Lu or a combination thereof; T is Al, Sc, Ga, In or combinations thereof; M is Ca, Sr, Ba or a combination thereof; N is Mg, Zn or a combination thereof. Some specific embodiments include the compositions where y=0 i.e., component includes 100% $Al^{3+}$. In these embodiments, the phosphor material includes the compositions of formula $R_{3-x-z}M_xCe_zAl_5O_{12-x}F_x$, wherein $0<x<3.0$, $0<z<0.30$; R is Y, Tb, Gd, La, Lu, or a combination thereof; and M is Ca, Sr, Ba or a combination thereof. One example is $Y_{2.71}Ce_{0.09}Ca_{0.20}Al_5O_{11.80}F_{0.20}$.

Some embodiments include the phosphor composition of general formula $Lu_{3-z}Ce_zAl_{5-y}N_yO_{12-y}F_y$; where $0 \leq y < 5.0$; $0 < z \leq 0.30$; N is Mg, Zn or combinations thereof. One example of the phosphor material is $Lu_{2.91}Ce_{0.09}Al_{4.80}Mg_{0.20}O_{11.80}F_{0.20}$.

Furthermore, the phosphor composition of formula I may be additionally doped with an additional activator ion. As used herein, the term "activator ion" refers to an ion (for example $Ce^{3+}$) doped in a phosphor that forms luminescent center and is responsible for the luminescence of the phosphor. Additional activator ions may include ions of Pr, Sm, Eu, Dy, Tm, Er, Ho, Nd, Bi, Pb, Yb or any combinations thereof.

The oxyfluoride phosphor composition, as disclosed herein, may be used in the lighting apparatus to generate light suitable for general illumination and other purposes. In some embodiments, the phosphor may be used in a lighting apparatus to generate green light for applications such as toys, traffic light, backlight, etc. In some embodiments, the phosphor may be used in combination with other phosphors (in a blend) to produce white light.

As described previously, the conventional garnet phosphors (e.g., YAG) that are generally used in a lighting apparatus, produce yellow-green emission (peak emission ~580 nm). When these garnets are used in combination with red-emitting phosphors in a blend to produce white light, the red-green contrast (may also be referred to as red-green separation) is not very good because of their efficient emission in yellow region.

The oxyfluoride phosphors of formulas I of the present invention has the advantage of producing narrower and blue-shifted emission relative to the conventional garnet phosphors. For example, when the present green-emitting oxyfluoride garnet compositions of formula I are used in combination with a red-emitting phosphor in a blend, the LED based lighting systems/devices produce white light with improved color rendering properties as compared to that are often achieved by using the conventional garnets. A deficiency in the yellow region of the present oxyfluoride garnets of formula I leads to increased red-green color contrast (or enhanced red-green separation) when objects are viewed under these lighting systems, in comparison to white LEDs that employ conventional yellow-green garnets. In some embodiments, an improvement in red-green contrast of a blend, employing the present oxyfluoride garnets of formula I, is at least about 5 percent, based on the red-green contrast of a blend including conventional garnet. In some specific embodiments, the improvement in red-green contrast is at least about 10 percent. Additionally, these blue-shifted green emission of oxyfluorides provide additional advantage to color blinds when used for green light emitting devices, for example in traffic light and backlights.

The oxyfluoride garnet phosphors for formula I may have a good quantum efficiency and high temperature performance comparative to the conventional garnet phosphors. These phosphors maintain their emission intensity across a large range of temperatures, which may mitigate losses of intensity and/or lamp color shifts as the temperature of a lighting system increases during use.

As alluded previously, the phosphor material may further include an additional phosphor composition to form a phosphor blend to produce white light from the lighting apparatus. In some embodiments, the phosphor blend may be applicable in a white light emitting LED lighting system. In one embodiment, the phosphor blend includes the oxyfluoride garnet of formula I as described above, and an additional phosphor composition that has a peak emission in a broad wavelength range from about 590 nanometers to about 680 nanometers.

The additional phosphor may be a complex fluoride that is a line emitter and generates red light. Suitable examples include complex fluorides doped with $Mn^{4+}$, for example $(Na, K, Rb, Cs, NH_4)_2[(Ti, Ge, Sn, Si, Zr, HOF_6]:Mn^{4+}$ and the like. In certain instances, a complex fluoride doped with $Mn^{4+}$ is $K_2[SiF_6]:Mn^{4+}$ ("PFS"). Examples of other additional phosphor compositions may include, but not limited to, red emitting oxynitrides/nitride phosphors activated with divalent europium ($Eu^{2+}$).

The phosphors listed above are not intended to be limiting. Any other phosphors, commercial and non-commercial, that form non-reactive blends with the oxyfluoride phosphors of the present invention may be used in blends and are to be considered to be within the scope of the present techniques. Furthermore, some additional phosphors may be used, e.g., those emitting throughout the visible spectrum region, at wavelengths substantially different from those of the phosphors described herein. These additional phosphors may be used in the blend to customize the white color of the resulting light, and to produce sources with improved light quality.

Each of the general formulas listed herein is independent of every other general formula listed. Specifically, x, y, z, and other variables that may be used as numeric placeholders in a formula are not related to any usage of x, y, z and other variables that may be found in other formulas or compositions.

When the phosphor material includes a blend of two or more phosphors, the ratio of each of the individual phosphors in the phosphor blend may vary, depending on the characteristics of the desired light output, for example color temperature. The relative amounts of each phosphor in the phosphor blend can be described in terms of spectral weight. The spectral weight is the relative amount that each phosphor contributes to the overall emission spectrum of the device. The spectral weight amounts of all the individual phosphors and any residual bleed from the LED source should add up to 100%.

The phosphors used to make phosphor blends, may be produced by mixing powders of the constituent compounds and then firing the mixture under a reducing atmosphere or by any technique known in the art. As known to those skilled in the art, the relative proportions of each phosphor in the phosphor blends may be adjusted, so that when their emissions are blended and employed in a lighting device or apparatus, there is produced visible light of predetermined ccx and ccy values on the CIE (International Commission on Illumination) chromaticity diagram. As stated, a white light is preferably produced.

By assigning appropriate spectral weights for each phosphor, one can create spectral blends to cover the relevant portions of color space for white lamps. For various desired CCT's, CRI's and color points, one can determine the appropriate amounts of each phosphor to include in the blend. Thus, one can customize phosphor blends to produce almost any CCT or color point, with corresponding acceptable CRI. Of course, the color of each phosphor will be dependent upon its exact composition (for example relative amounts of Ba, Ca, Sr, as well as Ce in a phosphor), which can change the color of the phosphor to a degree where it may have to be renamed. However, determining the changes in the spectral weight to produce the same or similar characteristic lighting device necessitated by such variations is trivial and can be accomplished by one skilled in the art using various methodologies, such as design of experiment (DOE) or other strategies.

By use of the present invention, particularly the blends described herein, lamps can be provided having high red-green contrast, high luminosity and acceptable CRI values, for a low range of color temperatures of interest (2500 K to 4000 K) for general illumination. Table 2 shows luminosity and CRI value of an exemplary blend.

EXAMPLES

The examples that follow are merely illustrative, and should not be construed to be any sort of limitation on the scope of the claimed invention.

Figure 3:
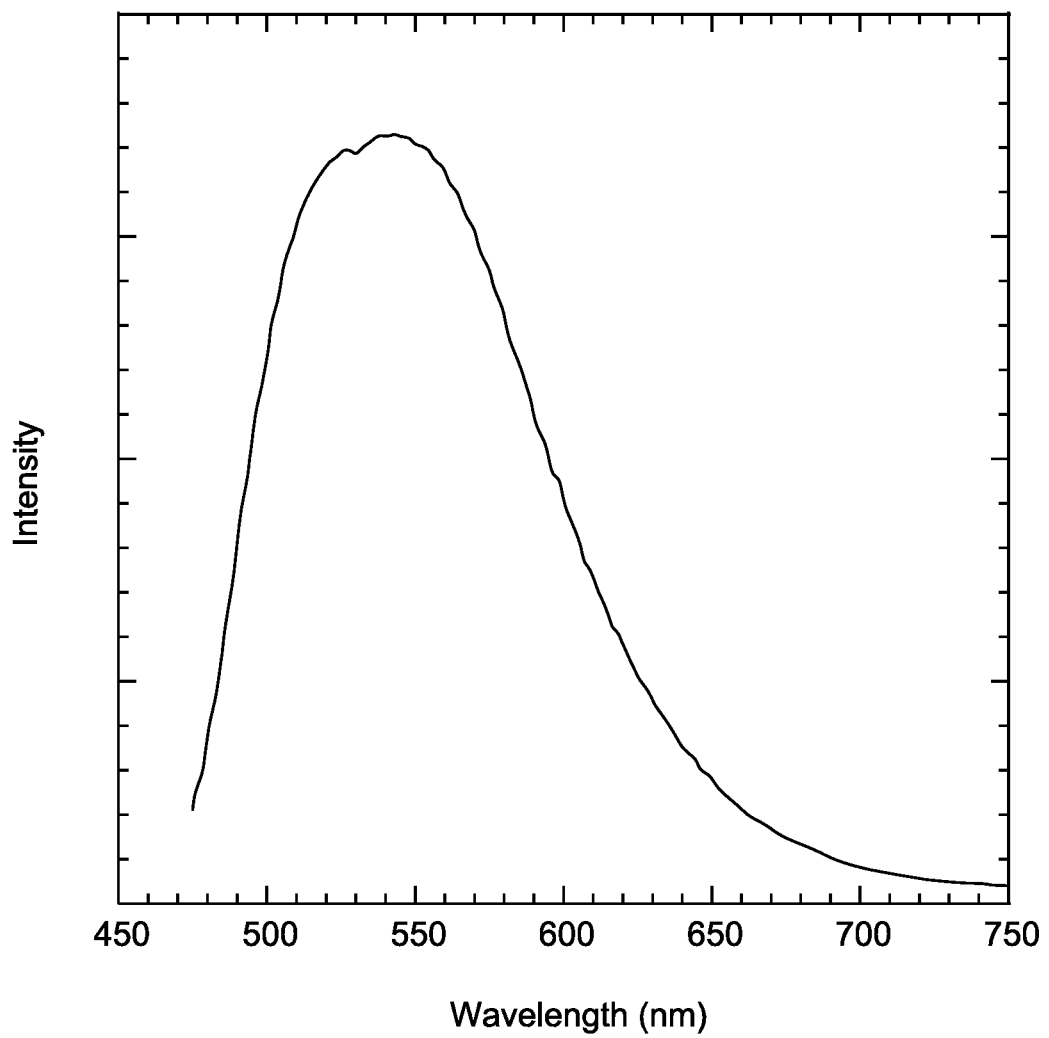
FIG. 3 shows the emission spectra of an oxyfluoride garnet phosphor using a 450 nanometers excitation wavelength, in accordance with an exemplary embodiment of the invention.

Two samples, an experimental blend and a comparative blend, were prepared as listed below in Table 1. The emission spectra of individual phosphors were obtained, and used in calculations to predict emission spectra for the blends presented in Table 1. FIG. 3 shows the emission spectra of oxyfluoride garnet composition $Lu_{2.91}Ce_{0.09}Al_{4.80}Mg_{0.20}O_{11.80}F_{0.20}$. This oxyfluoride garnet has its peak emission at about 540 nanometers. The calculations also included any visible light emitted by a light source.

TABLE 1

Examples of phosphor blends produced

| Sample | Phosphor blend |
|---|---|
| Experimental blend | $Lu_{2.91}Ce_{0.09}Al_{4.80}Mg_{0.20}O_{11.80}F_{0.20}/K_2[SiF_6]:Mn^{4+}$ |
| Comparative blend | $Y_3Al_5O_{12}:Ce^{3+}/K_2[SiF_6]:Mn^{4+}$ |

Table 2 shows spectral characteristics of the two sample blends of Table 1. The experimental blend generates white light having high red-green contrast while maintaining acceptable luminosity and CRI value at a low CCT between 2500K and 3000K.

TABLE 2

| Sample | Luminosity (lumen/watt) | CRI |
|---|---|---|
| Experimental blend | 312 | 73 |
| Comparative blend | 332 | 91 |

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A lighting apparatus comprising a light source and a phosphor material that is radiationally coupled to the light source, the phosphor material comprising a phosphor composition of general formula I: $R_{3-x-z}M_xCe_zT_{5-y}N_yO_{12-x-y}F_{x+y}$; where $0 \leq x < 3.0$; $0 \leq y < 5.0$, $0 < z \leq 0.30$; and if $x=0$, then $y>0$ or if $y=0$, then $x>0$; R is Y, Tb, Gd, La, Lu or a combination thereof; T is Al, Sc, Ga, In or combinations thereof; M is Ca, Sr, Ba or a combination thereof; N is Mg, Zn or a combination thereof.

2. The lighting apparatus of claim 1, wherein $0 \leq x < 1.0$.

3. The lighting apparatus of claim 1, wherein $0 \leq y < 2.0$.

4. The lighting apparatus of claim 1, wherein at least a portion of F in the phosphor composition of formula I is substituted by Cl, Br, I, or combinations thereof.

5. The lighting apparatus of claim 1, wherein the phosphor composition of formula I is doped with an additional activator ion selected from a group consisting of Pr, Sm, Eu, Dy, Tm, Er, Ho, Nd, Bi, Pb and Yb.

6. The lighting apparatus of claim 1, wherein the phosphor material comprises a phosphor composition of general formula $R_{3-x-z}M_xCe_zT_5O_{12-x}F_x$; where $0 \leq x < 3.0$, $0 < z \leq 0.30$; R is Y, Tb, Gd, La, Lu, or a combination thereof; M is Ca, Sr, Ba or a combination thereof; and T is Al, Sc, Ga, In or combinations thereof.

7. The lighting apparatus of claim 6, wherein the phosphor material comprises a phosphor composition of general formula $R_{3-x-z}M_xCe_zAl_5O_{12-x}F_x$, where $0 \leq x < 3.0$, $0 < z \leq 0.30$; and M is Ca, Sr, Ba or a combination thereof.

8. The lighting apparatus of claim 1, wherein the phosphor material comprises a phosphor composition of general formula $R_{3-z}Ce_zT_{5-y}N_yO_{12-y}F_y$; where $0 \leq y < 5.0$, $0 < z \leq 0.30$; R is Y, Tb, Gd, La, Lu, or a combination thereof; T is Al, Sc, Ga, In or combinations thereof; and N is Mg, Zn or combinations thereof.

9. The lighting apparatus of claim 8, wherein the phosphor material comprises a phosphor composition of general formula $R_{3-z}Ce_zAl_{5-y}N_yO_{12-y}F_y$; where $0 \leq y < 5.0$, $0 < z \leq 0.30$; and N is Mg, Zn or combinations thereof.

10. The lighting apparatus of claim 1, wherein the phosphor composition of formula I has a peak emission in a wavelength range from about 520 nanometers to about 620 nanometers.

11. The lighting apparatus of claim 1, wherein the phosphor composition of formula I has a peak emission in a wavelength range from about 530 nanometers to about 580 nanometers.

12. The lighting apparatus of claim 1, wherein the phosphor material further comprises an additional phosphor composition.

13. The lighting apparatus of claim 1, wherein the additional phosphor composition has a peak emission in a wavelength range from about 590 nanometers to about 650 nanometers.

14. The lighting apparatus of claim 12, wherein the additional phosphor composition comprises a manganese doped complex fluoride.

15. The lighting apparatus of claim 14, wherein the additional phosphor composition has a formula: $(Na, K, Rb, Cs, NH_4)_2[(Ti, Ge, Sn, Si, Zr, Hf)F_6]:Mn^{4+}$.

16. The lighting apparatus of claim 1, wherein the light source comprises a light emitting diode (LED) device based light source.

17. A lighting apparatus comprising: a light source and a phosphor material radiationally coupled to the light source, the phosphor material comprising a blend of: a phosphor composition of general formula I: $R_{3-x-z}M_xCe_zT_{5-y}N_yO_{12-x-y}F_{x+y}$; where $0 \leq x < 3.0$; $0 \leq y < 5.0$, $0 < z \leq 0.30$; and if $x=0$, then $y>0$ or if $y=0$, then $x>0$; R is Y, Tb, Gd, La, Lu or a combination thereof; T is Al, Sc, Ga, In or combinations thereof; M is Ca, Sr, Ba or a combination thereof; N is Mg, Zn or a combination thereof, and an additional phosphor composition having a peak emission in a wavelength range from about 590 nanometers to about 650 nanometers.

18. The lighting apparatus of claim 17, wherein the additional phosphor composition has a formula: $(Na, K, Rb, Cs, NH_4)_2[(Ti, Ge, Sn, Si, Zr, Hf)F_6]:Mn^{4+}$.

* * * * *